Aug. 12, 1969  W. SCHMID  3,460,578

COMPOSITE FLEXIBLE SHAFT CASING

Filed May 1, 1967

INVENTOR
Walter Schmid.

By Norton Lesser
Attorney 3,460,578
COMPOSITE FLEXIBLE SHAFT CASING
Walter Schmid, Bensenville, Ill., assignor to Stewart-Warner Corporation, Chicago, Ill., a corporation of Virginia
Filed May 1, 1967, Ser. No. 635,029
Int. Cl. F16l 11/08, 11/00
U.S. Cl. 138—125       4 Claims

ABSTRACT OF THE DISCLOSURE

The following specification describes a flexible shaft casing having an inner plastic tube covered by a wire braid in turn covered with an extruded outer plastic covering. The inner liner is provided with circumferentially spaced and radially raised longitudinal ribs which are intersected by the wires of the braid at spaced positions for holding the braid in position.

---

This invention relates in general to composite casings and more particularly to a flexible shaft casing employing an inner liner having means for securing a wire braid which is wound on the liner.

Flexible shaft casings employ a thin walled inner nylon tubing or liner which is usually lubricated by incorporation of a molydisulphide for rotatably supporting a flexible shaft. The inner liner is reinforced by a metal braid which inturn has a plastic outer covering of polypropylene, for example, extruded thereover to bind the braid and inner liner into a unitary structure. The braid, however, is subject to some shifting with undesirable effects. One method of overcoming this problem is to wind the braid with sufficient tension to embed the braid in the inner liner wall; however, this can catastrophically weaken or deform the liner wall, especially when the outer plastic covering is applied since this necessitates heat and pressure.

In order to avoid any tendency of the braid to shift, the inner liner in the present invention is provided with a plurality of circumferentially spaced and radially raised longitudinally or axially extending ribs or projections. When the wires of the braid are wound over the inner liner under only enough tension to embrace the liner outer surface between the ribs, the wires intercept the ribs at spaced positions to prevent a subsequent shift in position of the braid. Thus the ribs provide a very economical solution for preventing shift in the braid without winding the braid so tight that it bites into the body of the liner.

It is therefore an object of the present invention to provide an improved flexible shaft casing liner for preventing a shift in the position of a wire braid wound on the liner.

Figure 1:
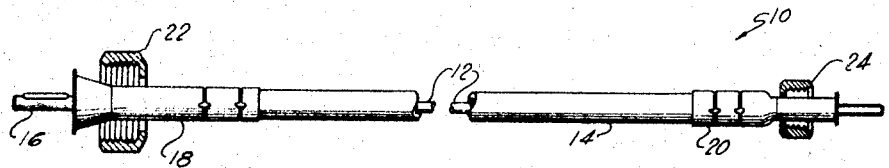
Figure 2:
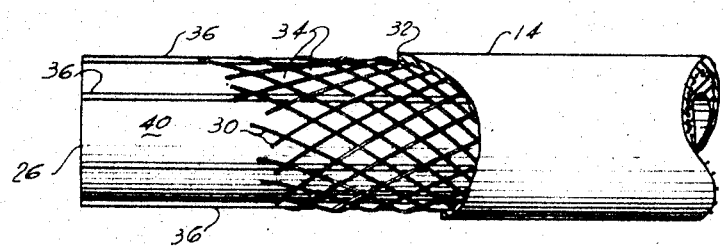
Figure 3:
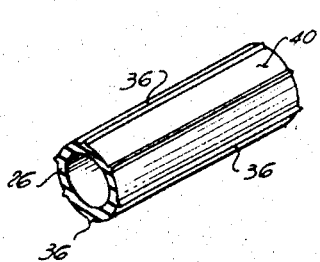
Figure 4:
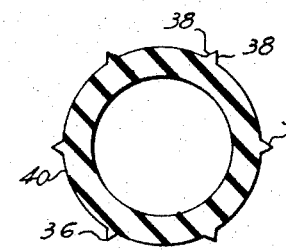
Figure 6:
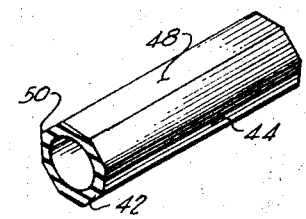
Figure 5:
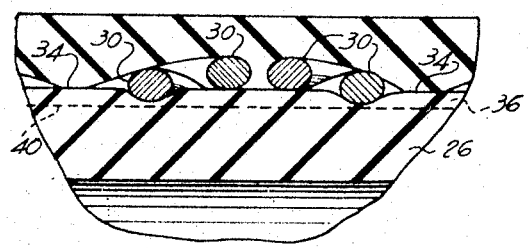

Other objects and features of this invention will become apparent upon examination of the following specification and claims together with the drawings wherein:

FIG. 1 illustrates a flexible shaft and casing assembly;
FIG. 2 is an enlarged view illustrating a portion of the flexible shaft casing with part of the outer covering and braid being shown stripped from the inner liner;
FIG. 3 is an isometric view of the inner liner;
FIG. 4 is an end view of the inner liner;
FIG. 5 is an enlarged fragmentary sectional view of the inner liner, braid and covering; and
FIG. 6 is an isometric view of another embodiment of the inner liner.

In FIG. 1 a flexible shaft assembly is indicated by the reference character 10. The assembly 10 comprises a flexible shaft 12 and an outer casing 14. The ends of the flexible shaft 12 are usually squared for engaging driving and driven elements (not shown) at respective ends to transmit motion therebetween. One end of the shaft 12 usually engages the driving element through a coupling 16 of the type shown in U.S. Patent No. 3,250,088, for example, to accommodate variations in routing distance. The casing 14 has end ferrules 18 and 20 which carry standard nuts 22 and 24, respectively, for fastening the casings to respective housings in which the driving and driven elements are located.

The casing 14 comprises an inner nylon or zytel liner 26 having a wall thickness of about .025" so that the wall is subject to distortion under local load. A helically wound braid 28 comprising a plurality of low carbon steel wires 30 is wound on the liner with successive wires 30 wound in opposite directions. The wires may comprise twisted strands, if desired, and are usually wound at a pitch of less than 2" for wires between .01 or .02" and weave under and over each other to provide what are commonly called pics. The pics per inch in a typical flexible shaft casing for use on a truck and employing the material described are usually 7¼ pics per inch although under other circumstances a larger or lesser number of pics per inch may be employed. An outer covering 32 of polypropylene is extruded over the braid and it fills the interstices 34 between the wires 30 to engage the inner liner 26 and provide a unitary casing assembly.

To prevent shifting of the braid while avoiding distortion of the liner wall, six circumferentially spaced longitudinally or axially extending ribs 36 are formed on the outer surface of the inner liner 26. The ribs are bounded by two planes indicated at 38 in FIG. 4 meeting at 60° and having a base height of .026" from the apex of the planes to the circumferential plane of the liner so that the ribs approximate the wire diameter. When the braid is wound under normal tension sufficient to lay the wire circumferentially on the outer surface of the inner liner between the ribs, as indicated by surface 40, the radially projecting ribs 36 are intersected by the wires 30 as shown in FIG. 5, to locally depress the apex of the ribs and prevent the wires from shifting axially. The wires are thus retained in position without distorting the wall of the liner, which is subject to this problem especially when heat and pressure are applied during extrusion of the outer covering 32. The longitudinally extending ribs also provide maximum strength in a direction resisting a shift in the braid and are relatively simple and economical to fabricate.

In FIG. 6 another embodiment of the liner is indicated by the reference character 42. In this case the outer surface 44 of the liner is provided with a longitudinally extending polygonal configuration of eight sides 48. The apex 50 or juncture of each side with the adjacent side defines a longitudinally extending rib or projection for intersecting the wires of the braid when they are wound with just sufficient tension to assume a position lying along an arc defined by a radial line from the center of the liner to the mid-point of each side, since this provides the desired undistorted wall thickness of substantially .025".

The foregoing constitutes a description of an improved composite casing having an inner liner formed to prevent shifting of the braid wound on the liner with the inventive concepts thereof believed set forth in the accompanying claims.

What is claimed is:
1. A casing for use with a flexible shaft, the improvement comprising an inner plastic liner for rotatably supporting said flexible shaft, a wire braid having wires helically wound on said inner liner to form interstices between said wires, an outer covering extruded over said braid and passing through said interstices to engage the outer surface of said liner, and a plurality of radially outwardly extending projections having a height substantially less than the thickness of said inner liner located on the outer surface of said inner liner with each projection extending the full length of said liner along a longitudinal axis parallel to the axis of said liner and transverse to the elongate axis of each of said helically wound wires for intersecting the wires of said braid at circumferentially and axially spaced positions with said braid making indentations in said projections to thereby prevent axial shifting of said braid.

2. The casing claimed in claim 1 in which said liner has a cylindrical outer surface and each said projection is formed by a pair of planar walls projecting outwardly from said outer surface towards each other to form a juncture between said planar walls located less than .03″ from the contour of said cylindrical surface between said walls.

3. The casing claimed in claim 1 in which the outer surface of said liner is defined by a plurality of flat contiguous axially extending surfaces forming a polygon with the juncture between respective surfaces of said polygon defining a respective projection.

4. A casing as claimed in claim 1 wherein the wires of said braid are helically wound in opposite directions on said liner under only sufficient tension to engage the outer surface of said liner and to provide at least 4 pics per inch with said interstices between said wires, and each projection extends for the full length of said liner along a respective line parallel to the axis of said liner and transverse to the axis of each of said helically wound wires for intersecting the wires of said braid at spaced positions to thereby prevent axial shifting of said braid.

References Cited
UNITED STATES PATENTS

| | | | |
|---|---|---|---|
| 2,242,691 | 3/1966 | Robinson et al. | 138—133 |
| 3,314,449 | 4/1967 | Krone et al. | 138—137 |
| 3,320,665 | 5/1967 | Morse | 138—133 |

HENRY S. JAUDON, Primary Examiner

U.S. Cl. X.R.

138—133